(12) United States Patent
Nobuoka

(10) Patent No.: US 7,327,395 B2
(45) Date of Patent: Feb. 5, 2008

(54) AUTOFOCUS APPARATUS

(75) Inventor: Kosuke Nobuoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 10/729,575

(22) Filed: Dec. 4, 2003

(65) Prior Publication Data

US 2004/0119871 A1 Jun. 24, 2004

(30) Foreign Application Priority Data

Dec. 13, 2002 (JP) ............................. 2002-361942

(51) Int. Cl.
*H04N 5/232* (2006.01)
(52) U.S. Cl. .................................... 348/349; 348/240.2
(58) Field of Classification Search ................ 348/342, 348/345, 354, 355, 349, 240.2, 240.99, 347
See application file for complete search history.

(56) References Cited

U.S. PATENT DOCUMENTS

| | | | | |
|---|---|---|---|---|
| 5,345,264 | A * | 9/1994 | Murata et al. ............... | 348/235 |
| 5,475,429 | A * | 12/1995 | Kodama ..................... | 348/350 |
| 5,614,951 | A * | 3/1997 | Lee et al. .................... | 348/356 |
| 5,623,309 | A * | 4/1997 | Yoshimura et al. ......... | 348/355 |
| 5,694,168 | A * | 12/1997 | Toji ............................. | 348/350 |
| 5,838,370 | A * | 11/1998 | Kaji ......................... | 348/240.2 |
| 5,877,806 | A | 3/1999 | Kawano | |
| 6,342,922 | B1 * | 1/2002 | Mizoguchi .................. | 348/355 |
| 6,445,416 | B1 * | 9/2002 | Kyuma et al. ........... | 348/240.3 |
| 6,621,521 | B1 | 9/2003 | Ohta | |
| 6,989,864 | B2 | 1/2006 | Ohta | |
| 2002/0080258 | A1 * | 6/2002 | Ohta ........................... | 348/347 |
| 2005/0264681 | A1 | 12/2005 | Ohta | |

FOREIGN PATENT DOCUMENTS

| | | |
|---|---|---|
| JP | 01-137886 | 5/1989 |
| JP | 04-046471 | 2/1992 |
| JP | 08-130669 | 5/1996 |
| JP | 08-130670 | 5/1996 |
| JP | 10-042184 | 2/1998 |
| JP | 10-164603 | 6/1998 |
| JP | 2003-274245 | 9/2003 |

OTHER PUBLICATIONS

English translation of Japanese Office Action dated May 29, 2007 of the counterpart Japanese Patent Application 2002-361942.

* cited by examiner

*Primary Examiner*—Lin Ye
*Assistant Examiner*—Amy Hsu
(74) *Attorney, Agent, or Firm*—Cowan, Liebowtiz & Latman, P.C.

(57) ABSTRACT

When a high-frequency component of a video signal that is output from a CCD image sensor (1-2) can be extracted from band-pass filters (1-13, 1-14), the band-pass filters (1-13, 1-14) are changed in accordance with the number of pixels in the video signal. Even if the spatial sampling frequency (high-frequency component) of the video signal changes, a frequency component of an optimum band can be extracted.

4 Claims, 3 Drawing Sheets

AUTOFOCUS APPARATUS

FIELD OF THE INVENTION

This invention relates to an autofocus apparatus for performing a focusing operation using high-frequency components of a video signal.

BACKGROUND OF THE INVENTION

In a conventional autofocus apparatus that performs a focusing operation using the high-frequency components of a video signal, a prescribed frequency component extracted by a band-pass filter is extracted from a video signal in a signal processing circuit and lens control is carried out in such a manner that the prescribed frequency component will take on as large a value as possible in order to prevent against the effects of noise. This utilizes a phenomenon in which, if the focused state has been achieved, image sharpness increases and high-frequency components increase in relative terms. This type of autofocus apparatus merely involves providing a frequency-component extracting circuit within a video signal processing circuit and thus it frequently finds use in inexpensive consumer-oriented video cameras.

The prescribed frequency component necessary to implement the above-described autofocus operation is a prescribed spatial frequency component in the spatial frequency region of video displayed on a screen. The spatial sampling frequency, which is important when extracting the prescribed spatial frequency component, changes depending upon the number of pixels in the video signal.

In a conventional video camera that merely records moving pictures, the number of pixels in an image signal from output by a CCD image sensor to recording on video tape is 768 horizontally×525 vertically or 720 horizontally×480 vertically owing to various format limitations involved in recording a moving picture on video tape. The former number of pixels is in accordance with the NTCS video format and the latter in accordance with the DVC recording format. In an autofocus apparatus, therefore, a fully satisfactory autofocus operation can be obtained if use is made of a filter for extracting a spatial frequency component, which is optimum in terms of performing the autofocus operation, from a video signal of the number of pixels mentioned above.

Recent consumer-oriented video cameras not only record moving images on video tape but also are equipped with a so-called digital camera function that enables still images to be captured and recorded in an image memory. In such recording of still images, there is no limitation on format relating to number of pixels in the images and therefore the number of pixels used in still images is steadily increasing in order to achieve higher image quality for such images. For example, in a situation where a still image composed of a total of 1,300,000 pixels has been captured, the image sensor provides a 1280H×960V video signal.

When a filter that extracts the optimum frequency component for autofocus from a 768H×525V video signal is used to extract the aforesaid frequency component from a 1280H×960V video signal, the number of pixels is approximately 1.5 times as large and therefore the spatial sampling frequency also is about 1.5 times as large. This means that the frequency component for autofocus also becomes approximately 1.5 times that of the optimum component. The problem that arises is that the desired autofocus operation can no longer be carried out. Specifically, even though photography is performed in one and the same video camera, the accuracy of autofocus at the time of moving-picture photography differs from that of still-picture photography.

Further, since an image sensor has a large number of pixels, as mentioned above, it has been contemplated to execute electronic wide-screen processing (zoom processing) by reducing the multipixel image. In this case also, however, the image used in presenting the screen display still has an elevated spatial sampling frequency because the image originally has a large number of pixels. Consequently, the optimum spatial frequency component used in autofocus can no longer be obtained and the desired autofocus operation can no longer be carried out just as before.

SUMMARY OF THE INVENTION

Accordingly, an object of the present invention is to realize an autofocus apparatus for performing the optimum autofocus operation regardless of the photography mode and electronic zoom processing.

According to an embodiment of the present invention, the foregoing object is attained by providing an autofocus apparatus for performing a focusing operation using a frequency component of a video signal, comprising: extracting means for extracting a frequency component of a prescribed band in the video signal; and changing means for changing the band of the frequency component, which is extracted by the extracting means, in accordance with the number of pixels of the video signal.

By virtue of the foregoing, the autofocus apparatus according to the present invention is capable of extracting a fixed frequency component even in a case where video signals composed of different numbers of pixels in moving-picture and still-picture photography modes are provided and the spatial sampling frequency of the video signal changes. As a result, stable autofocus operation can be provided irrespective of the number of pixels in the video signal. In addition, similar effects are obtained even in electronic processing for reducing an image.

In accordance with the present invention, a frequency component in a band that is optimum for an autofocus operation can be extracted regardless of the mode of photography and electronic zoom processing, and a stable autofocus operation can be provided.

In another embodiment of the invention, the autofocus apparatus is provided with a plurality of the extracting means, and the changing means selects a desired one of the extracting means from the plurality thereof and the band is changed using the desired extracting means.

In another embodiment of the invention, the extracting means comprises a digital filter having a coefficient that is variable.

In another embodiment of the invention, the extracting means includes first frequency component extracting means operable in a moving-picture photography mode and second frequency component extracting means operable in a still-picture photography mode; the changing means changing the band by selecting one of the first frequency component extracting means and second frequency component extracting means.

In another embodiment of the invention, the changing means changes the band in accordance with zoom magnification of zoom processing when electronic zoom processing, in which the number of pixels of the video signal is changed, is executed.

In another embodiment of the invention, the frequency component is a high-frequency component.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention and therefore reference is made to claims which follow the description for determining the scope of the invention.

DETAILED DESCRIPTION OF THE PREFERRED EMBODIMENTS

Embodiments of an autofocus apparatus according to the present invention will now be described with reference to the accompanying drawings.

First Embodiment

Figure 1:
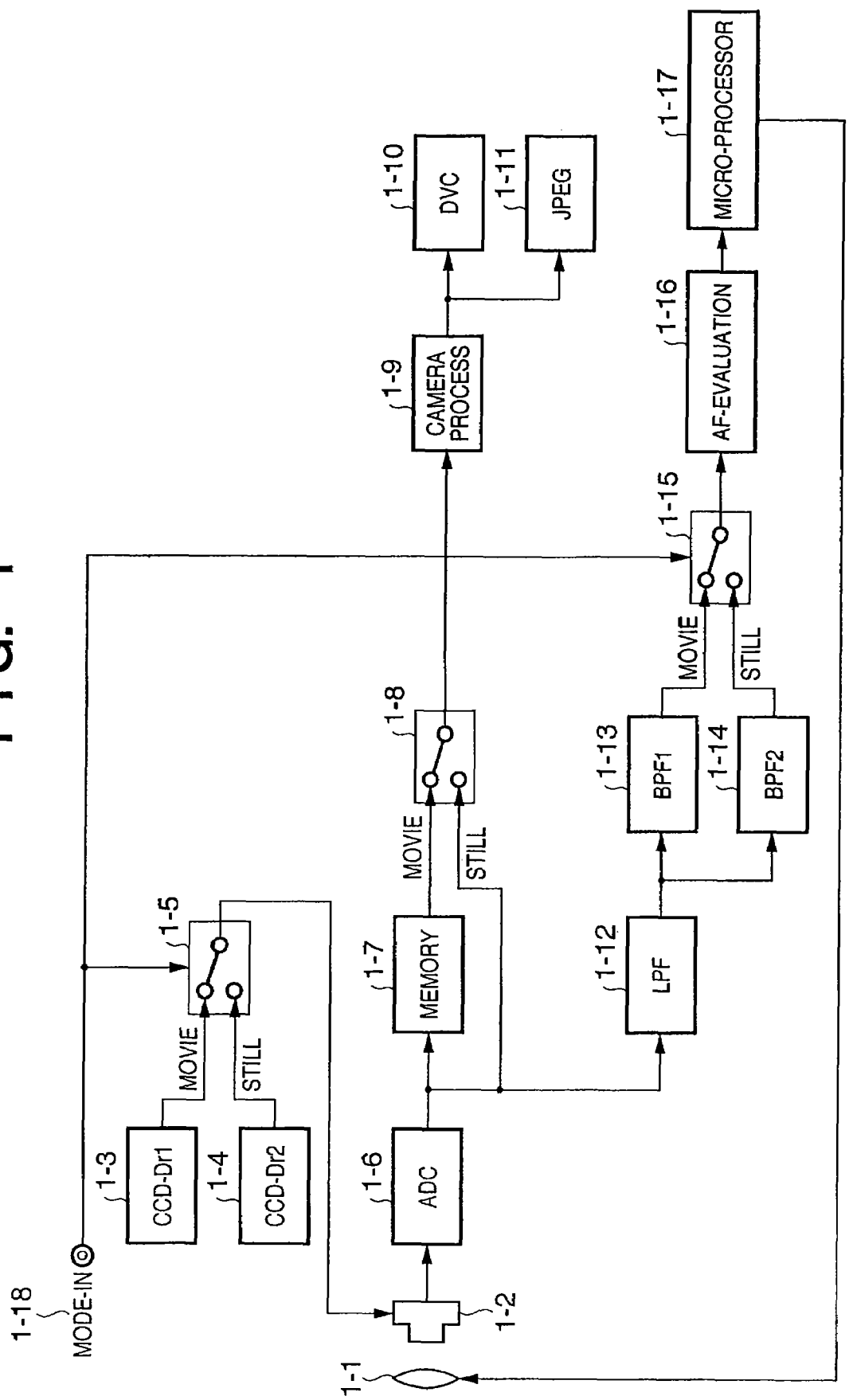
FIG. 1 is a block diagram illustrating an autofocus apparatus according to a first embodiment of the present invention.

FIG. 1 is a block diagram illustrating an autofocus apparatus according to a first embodiment of the present invention.

Shown in FIG. 1 are an image-forming optical lens 1-1, a CCD image sensor 1-2, a first CCD driver 1-3, a second CCD driver 1-4, a first switch 1-5, an A/D converter 1-6, a 1H line memory 1-7, a second switch 1-8, a camera signal processor 1-9, a DVC moving-picture recorder 1-10, a JPEG still-picture recorder 1-11, a low-pass filter 1-12, a first band-pass filter 1-13, a second band-pass filter 1-14, a third switch 1-15, an AF evaluation-value detector 1-16, a microcomputer 1-17 and a photography mode input unit 1-18.

The operation of the autofocus apparatus according to the first embodiment of the invention will be described with reference to FIG. 1. This embodiment has two photography modes that are set by the photography mode input unit 1-18. The modes are a moving-picture photography mode and a still-picture photography mode.

First, in the moving-picture photography mode, the first switch 1-5, second switch 1-8 and third switch 1-15 are all connected to a "Movie" side. As a result, the first CCD driver 1-3 is selected as the CCD driver that drives the CCD image sensor 1-2, the output signal from the 1H line memory 1-7 is selected as the input signal to the camera signal processor 1-9 and the output signal from the first band-pass filter 1-13 is selected as the input signal to the AF evaluation-value detector 1-16.

More specifically, an optical image that has been formed on the photoreceptor surface of the CCD image sensor 1-2 via the image-forming optical lens 1-1 is opto-electronically converted by the CCD image sensor 1-2 and is delivered as a CCD output signal by the first CCD driver 1-3. Here the number of effective pixels of the CCD image sensor 1-2 is 1280H×960V. From the effective pixels of the CCD image sensor 1-2, the first CCD driver 1-3 operates so as to cut out an image based upon vertically directed pixels and derives a 1280H×480V CCD signal.

Next, the 1280H×480V CCD signal obtained from the CCD image sensor 1-2 is converted to a digital signal by the A/D converter 1-6 and the digital signal is input to the 1H line memory 1-7. The latter operates so as to apply a pixel conversion to the horizontal lines of the 1280H×480V CCD signal and cut out 720H from 1280H. That is, the output of the 1H line memory 1-7 is a 720H×480V CCD signal.

The camera signal processor 1-9 then executes camera signal processing based upon the 720H×480V CCD signal. The signal thus obtained is a 720H×480V video signal that conforms to the DVC format. This signal is recorded as a moving picture in the DVC moving-picture recorder 1-10.

Further, the digital CCD signal output from the A/D converter 1-6 has its color carrier component removed by the low-pass filter 1-12. The spatial frequency component necessary for the autofocus operation is then extracted by the first band-pass filter 1-13. The latter extracts the optimum spatial frequency component calculated based upon the spatial sampling frequency of the 720H×480V image. This spatial frequency component is input to the AF evaluation-value detector 1-16, where an evaluation value for autofocus is detected.

The evaluation value for autofocus detected by the AF evaluation-value detector 1-16 is then read by the microcomputer 1-17, which proceeds to control the focus of the image-forming optical lens 1-1 based upon the evaluation value.

In the still-picture photography mode, on the other hand, the first switch 1-5, second switch 1-8 and third switch 1-15 are all connected to a "Still" side. As a result, the second CCD driver 1-4 is selected as the CCD driver that drives the CCD image sensor 1-2, the output signal from the A/D converter 1-6 is selected as the input signal to the camera signal processor 1-9 and the output signal from the second band-pass filter 1-14 is selected as the input signal to the AF evaluation-value detector 1-16.

More specifically, an optical image that has been formed on the photoreceptor surface of the CCD image sensor 1-2 via the image-forming optical lens 1-1 is opto-electronically converted and is delivered as a CCD output signal by the second CCD driver 1-4. Here the second CCD driver 1-4 operates so as to derive the entire 1280H×960V CCD signal, which is composed of a number of pixels which are the number of effective pixels of the CCD image sensor 1-2.

Next, the 1280H×960V CCD signal obtained from the CCD image sensor 1-2 is converted to a digital signal by the A/D converter 1-6 and the digital signal is input to the camera signal processor 1-9 as is.

The camera signal processor 1-9 then executes camera signal processing based upon the 720H×960V CCD signal. The signal thus obtained is recorded as a still picture by the JPEG still-picture recorder 1-11.

Further, the digital CCD signal output from the A/D converter 1-6 has its color carrier component removed by the low-pass filter 1-12. The spatial frequency component necessary for the autofocus operation is then extracted by the second band-pass filter 1-14. The latter extracts the optimum spatial frequency component calculated based upon the spatial sampling frequency of the 1280H×960V image. This spatial frequency component is input to the AF evaluation-value detector 1-16, where an evaluation value for autofocus is detected.

The evaluation value for autofocus detected by the AF evaluation-value detector 1-16 is then read by the microcomputer 1-17, which proceeds to control the focus of the image-forming optical lens 1-1 based upon the evaluation value.

Second Embodiment

Figure 2:
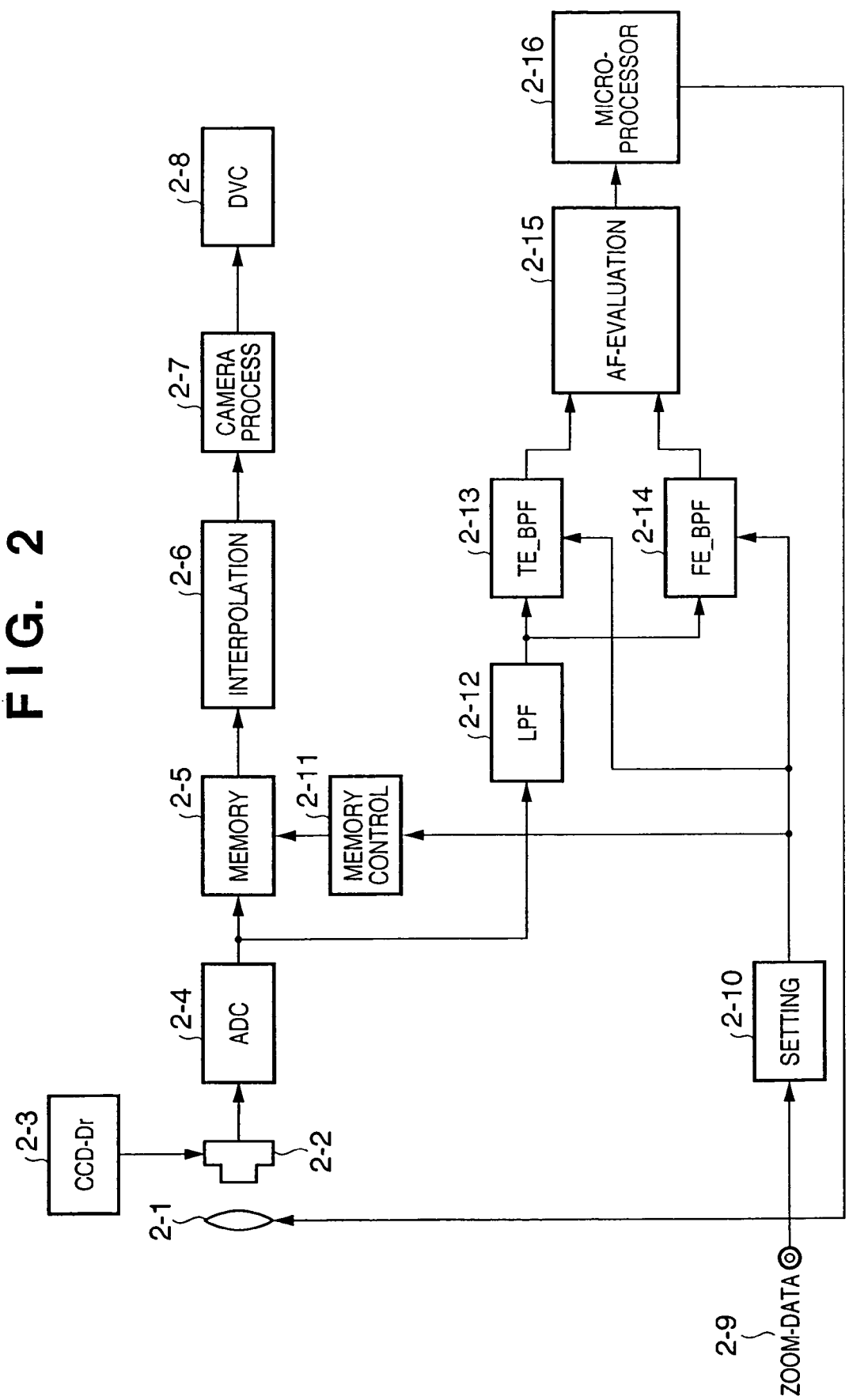
FIG. 2 is a block diagram illustrating an autofocus apparatus according to a second embodiment of the present invention.

FIG. 2 is a block diagram illustrating an autofocus apparatus according to a second embodiment of the present invention.

Shown in FIG. 2 are an image-forming optical lens 2-1, a CCD image sensor 2-2, a CCD driver 2-3, an A/D converter 2-4, a memory 2-5, an interpolating processor 2-6, a camera signal processor 2-7, a DVC moving-picture recorder 2-8, a zoom magnification input unit 2-9, a setting controller 2-10, a memory controller 2-11, a low-pass filter 2-12, a TE band-pass filter 2-13, FE band-pass filter 2-14, an AF evaluation-value detector 2-15 and a microcomputer 2-16.

Figure 3:
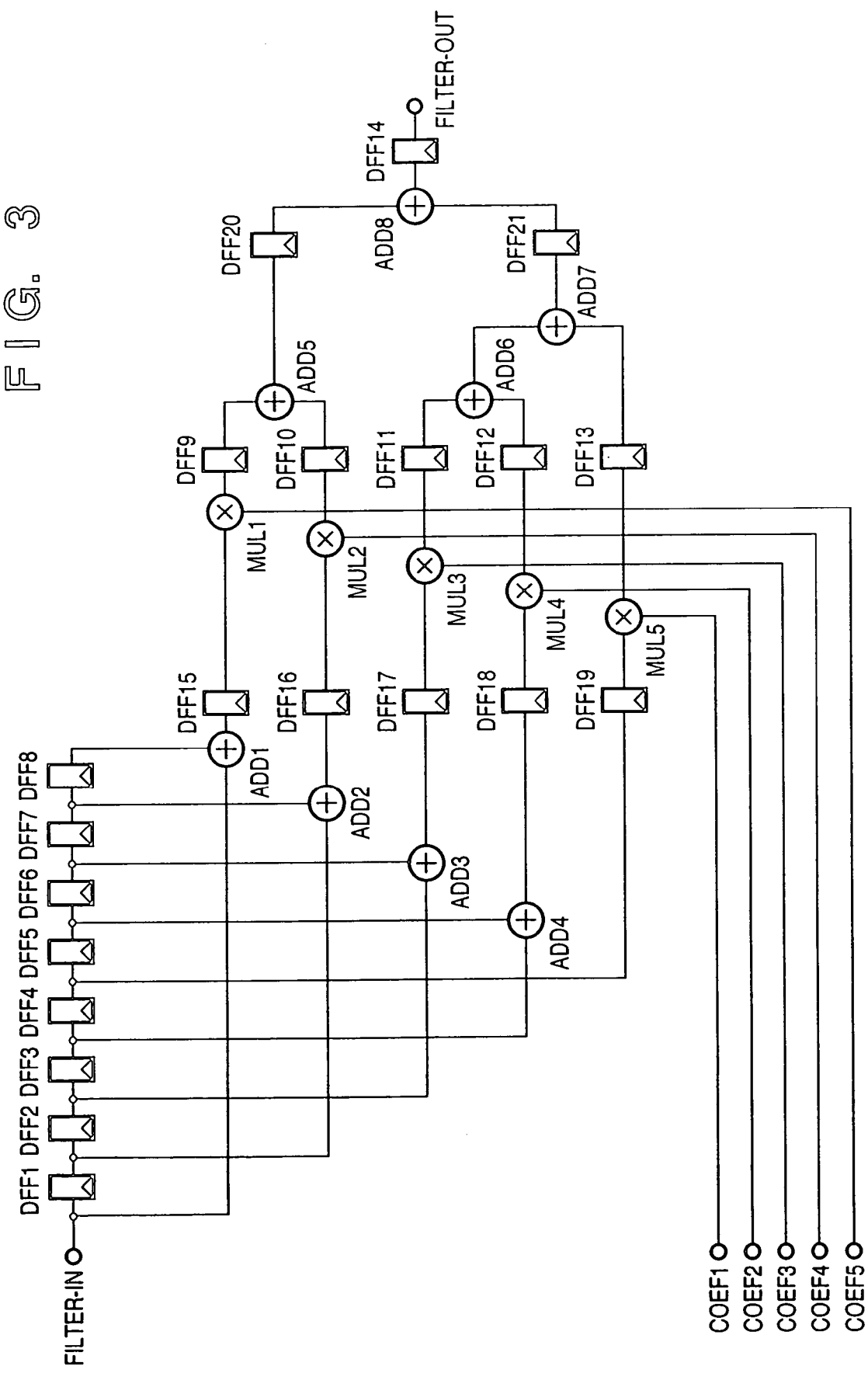
FIG. 3 is a diagram illustrating the internal structure of a band-pass filter for TE (Top Evaluate) and a band-pass filter for FE (Foot Evaluate) depicted in FIG. 2.

FIG. 3 is a diagram illustrating the internal structure of the TE band-pass filter 2-13 and FE band-pass filter 2-14 shown in FIG. 2. It should be noted that the internal structures of the TE band-pass filter 2-13 and FE band-pass filter 2-14 are identical.

The operation of the autofocus apparatus according to the second embodiment of the invention will now be described.

An optical image that has been formed on the photoreceptor surface of the CCD image sensor 2-2 via the image-forming optical lens 2-1 is opto-electronically converted by the CCD image sensor 2-2 and is swept out as a CCD signal by a drive signal generated by the CCD driver 2-3. Here the number of effective pixels of the CCD image sensor 2-2 is 1280H×960V. However, the CCD driver 2-3 operates so as to sweep out the entirety of the 1280H×960V CCD signal from the CCD image sensor 2-2 at all times.

Next, the 1280H×960V CCD signal obtained from the CCD image sensor 2-2 is converted to a digital signal by the A/D converter 2-4, after which the digital CCD signal is converted to the number of pixels in the memory 2-5.

The digital CCD signal that has been converted to the number of pixels is then subjected to signal interpolation processing in the interpolating processor 2-6, prescribed processing such as a gamma correction and color signal processing is applied by the camera signal processor 2-7 and then moving-picture recording in accordance with the DVC format is performed in the DVC moving-picture recorder 2-8.

According to this embodiment, electronic zoom processing of various magnifications is implemented by the memory 2-5, memory controller 2-11 and interpolating processor 2-6. As mentioned above, the 1280H×960V CCD signal is input to the memory 2-5 at all times. Since the moving picture recorded by the DVC moving-picture recorder 2-8 is a 720H×480V image according to the DVC format, the entirety of the 1280H×960V CCD signal is written to the memory 2-5. When the signal is read out of the memory 2-5, interpolation is applied so that the 1280H×960V image can be reduced to a 720H×480V image.

By way of example, if an area of 720H×480V is cut out of the 1280H×960V image, written to the memory 2-5 at write time and the entirety is read out of the memory at read time, then magnification will be 1:1. If an area of 480H× 320V is cut ouf of the 1280H×960V image, written to the memory 2-5 at write time, the entirety is read out of the memory at read time and the image is interpolated to an image size of 720H×480V by the interpolating processor 2-6, then an enlarged image is obtained.

The enlargement ratio of the electronic zoom processing is specified from the zoom magnification input unit 2-9 and the setting controller 2-10 operates so as to change over the write/read control method of the memory 2-5 performed by the memory controller 2-11.

In the above-described example of electronic zoom, three types of operation are exemplified. They are as follows: (1) Start with 1280H×960V, reduce the image at memory read and obtain 720H×480V; (2) start with 1280H×960V, extract pixels at memory write and obtain 720H×480V; and (3) start with 1280H×960V, extract pixels at memory write, obtain 480H×320V and interpolate to 720H×480V. However, in these three examples of operation, the spatial sampling frequency of the image at the time of the screen display is different in each example.

Accordingly, in this embodiment, it is so arranged that the coefficient data of the filters used in the TE band-pass filter 2-13 and FE band-pass filter 2-14 can be rewritten based upon the zoom magnification. As a result, a band-pass filter that always has the optimum frequency characteristic can be provided in conformity with a change in spatial sampling frequency. Here "TE" and "FE" are abbreviations of "Top-Evaluate" and "Foot-Evaluate", respectively. The TE band-pass filter 2-13 is used for an autofocus operation in the vicinity of the in focus point, and the FE band-pass filter 2-14 is used for judging blurring.

With regard to the frequency characteristics of the band-pass filters, that of the TE band-pass filter 2-13 is higher (a pass band of 500 kHz to 2.5 MHz about a spatial frequency of about 1.5 MHz as center) and that of the FE band-pass filter 2-14 is lower (a pass band of 150 kHz to 1.2 MHz about a spatial frequency of about 500 kHz as center). With regard to the internal structure of the TE band-pass filter 2-13 and FE band-pass filter 2-14 shown in FIG. 3, both band-pass filters are FIR-type filters with five taps on one side. Any coefficients (Coef1 to Coef5 in FIG. 3) can be set in five multipliers (MUL1 to MUL5 in FIG. 3), respectively. Accordingly, even if the spatial sampling frequency is changed by a change in zoom magnification, the pass bands of the TE band-pass filter 2-13 and FE band-pass filter 2-14 can be held constant by applying the corresponding coefficient.

The thus obtained signals for evaluation from TE band-pass filter 2-13 and FE band-pass filter 2-14 are sent to the AF evaluation-value detector 2-15, which proceeds to detect an evaluation value for the purpose of carrying out autofocus control. Next, the detected evaluation value is read by the microcomputer 2-16, which proceeds to control the image-forming optical lens 2-1 and implement autofocus control.

Thus, in accordance with the embodiments of the present invention, even if the number of pixels in a video signal changes, e.g., even if video signals composed of different numbers of pixels in moving-picture and still-picture photography modes are provided and the spatial sampling frequency of the video signal changes depending upon the photography mode, or even if the spatial sampling frequency changes depending upon electronic image enlargement or reduction processing, a spatial frequency component (high-frequency component) that is optimum for an autofocus operation can be extracted regardless of the sampling frequency and a stable autofocus operation can be carried out.

The present invention is not limit d to the above embodiments and various changes and modifications can be made within the spirit and scope of the present invention. Therefore, to apprise the public of the scope of the present invention, the following claims are made.

What is claimed is:

1. An autofocus apparatus for performing a focusing operation using a frequency component of a video signal, comprising:
- a cutting unit adapted to cut out the video signal;
- an interpolating unit adapted to interpolate the video signal;
- an extracting unit adapted to extract a frequency component of a prescribed band in the video signal; and
- a changing unit adapted to change the band of the frequency component extracted by said extracting unit, where the video signal is not only cut out by said cutting unit but is interpolated by said interpolating unit.

2. The apparatus according to claim 1, wherein a plurality of said extracting unit are provided, and said changing unit selects a desired one of the extracting unit from said plurality thereof and the band is changed using said desired extracting unit.

3. The apparatus according to claim 1, wherein said extracting unit comprises a digital filter having a coefficient that is variable.

4. The apparatus according to claim 1, wherein the frequency component is a high-frequency component.

* * * * *